April 28, 1936. R. R. HUTCHISON 2,039,002
OIL PAN ASSEMBLY
Filed July 25, 1935
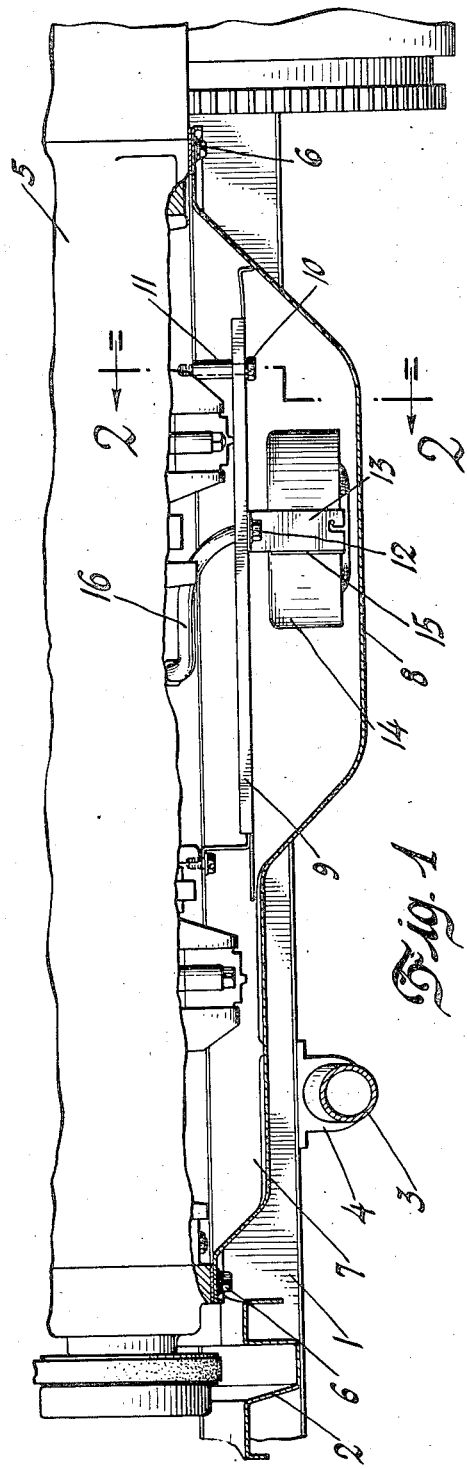
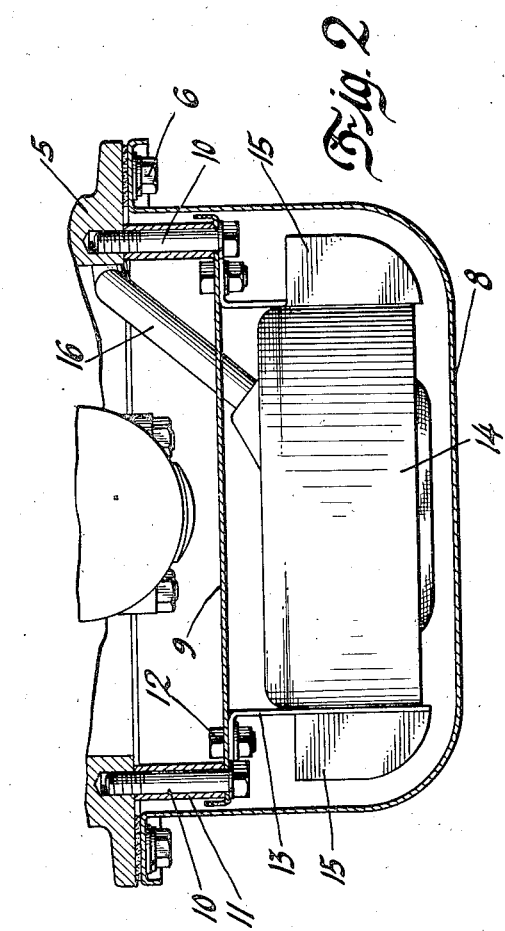
Inventor
Robert R. Hutchison
By Blackmore, Spencer & Flint
Attorneys Patented Apr. 28, 1936

2,039,002

UNITED STATES PATENT OFFICE 2,039,002

OIL PAN ASSEMBLY

Robert R. Hutchison, Pontiac, Mich., assignor to General Motors Corporation, Detroit, Mich., a corporation of Delaware Application July 25, 1935, Serial No. 33,014

4 Claims. (Cl. 180—54)

This invention relates to motor vehicles and more particularly to an improved oil pan and tray construction for the crank case of an engine which is located forward in the chassis frame and immediately over the front axle structure.

The present tendency in motor car design is to place the engine farther ahead than has been usual in the past, whereby the front of the engine overlies and projects on both sides of the axle. The axle, therefore, obstructs access to and removal of the oil pan and tray unless the engine is completely removed from the frame. The reason for this is that the oil tray used in modern engines is carried as a unit with the oil pan and the oil pump intake conduit which extends downwardly through a small opening in the tray interferes with the manipulation of the assembly. To permit inspection and repair of the parts enclosed within the engine crank case without disturbing the mounting of the engine assembly it is here proposed to attach the oil pan and the oil tray separately to the bottom of the cylinder block without interconnection to each other, whereby upon detachment of the fastening bolts the pan, after being dropped slightly, can be shifted rearwardly to clear the axle.

The invention will be best understood upon reference to the accompanying drawing illustrating a preferred, but not necessarily the only, embodiment thereof, and in which Figure 1 is a side elevation of a small portion of the motor vehicle with parts in section, and Figure 2 is a transverse sectional view on line 2—2 of Figure 1.

Referring to the drawing, the numeral 1 indicates one of the side members of a vehicle chassis frame and 2 a front cross member thereof. Spaced rearwardly from the frame member 2 is a transversely extending axle structure 3, which is shown in the drawing as connected to each frame member by a bracket 4. This type of axle structure is intended for use with independent wheel suspension wherein a resilient spring connects the end of the axle with a road wheel. It will be understood that the conditions being dealt with are substantially the same with that type of axle which is connected to the frame through resilient load supporting springs.

The engine, of which only the crank case 5 of the cylinder block is shown, extends forwardly beyond the axle structure 3 and for this reason the oil pan removably secured over the underside of the crank case 5 by screw studs 6 has a relatively shallow portion at the front and a much deeper portion at the rear, the rearward portion constituting an oil sump. The bottom wall of the pan is, therefore, of stepped formation with the higher or raised portion 7 thereof projecting to the front of the engine and above the axle 3 while the lower portion 8 of the bottom wall toward the rear of the pan, is positioned somewhat below the top of the axle in the horizontal plane.

Extending across the depressed sump in spaced relation to the bottom wall 8 and in substantial alinement with the raised wall 7 is the usual tray 9 which is entirely independent of the pan and is secured to the underside of the cylinder block 5 by bolts 10 and spacer sleeves 11. At an intermediate point, fastening bolts 12 secure to the underside of the tray, a pair of transversely spaced dependent straps 13 for supporting an oil strainer assembly 14, which as shown may consist of an upper imperforate cover element and a lower foraminous element located within the sump in spaced relation to the walls thereof. Wings or lateral ears 15 on the straps 13 are provided as baffles to prevent excessive splashing. Directed upwardly from within the strainer 14 and through an opening in the plate 9 is a conduit 16, which affords the intake leading to the suction side of an engine driven pump by which crank case oil is delivered under pressure to the several engine bearings.

It will be seen, therefore, that the strainer device located within the sump in substantially the horizontal plane of the axle structure is secured to the engine block independently of the oil pan and that the oil intake pipe extending into the strainer offers no interference to removal of the pan. The pan may be easily removed by first dropping it slightly to clear the strainer device and then shifting it rearwardly to clear the axle structure. It will be seen too that the axle structure offers no interference to the removal of the tray if removal of the tray is desired.

I claim:

1. In a motor vehicle, an engine having an oil intake in the crank case thereof, an axle structure positioned directly below the engine in longitudinally spaced relation to said intake in substantially the horizontal plane of the intake, a removable crank case pan having a bottom wall raised to a level above the axle structure throughout the portion thereof adjacent one end and dropped to a lower level beneath said intake, a strainer for said intake located within said dropped portion of the pan, and means to mount the strainer on the engine separately from the pan, whereby the pan may be removed without disturbing the strainer mounting by first dropping one end thereof to clear the strainer and then shifting the pan longitudinally to clear the axle structure.

2. In a motor vehicle, an axle structure, an engine having its forward portion positioned directly above said axle structure, a crank case pan having its entire forward portion extending above the axle structure and its rearward portion extending in the plane of the axle structure in longitudinally spaced relation thereto, and an oil tray device mounted in the rearward portion of the pan and independently secured to the engine, whereby the pan may be removed without disturbing said device by dropping the rearward portion thereof and then shifting the whole pan rearwardly beyond the axle structure.

3. In a motor vehicle having an engine positioned at one end over an axle structure, a crank case pan having a relatively shallow bottom throughout the end portion thereof above the axle structure and a relatively deep bottom beyond the axle structure to receive a strainer device for an oil pump intake, a tray extending above the deep portion of the pan in substantial alinement with the shallow bottom and means securing the tray and pan independently to the engine.

4. In a motor vehicle, an axle structure, an engine having one end projecting directly over the axle structure, an oil intake device forming a part of the engine lubricating system and being located near the other end of the engine in substantially horizontal alinement with said axle structure, an oil pan closing the underside of the engine crank case and providing a sump for said oil intake device, the bottom wall of said pan being stepped with its lower portion beneath the intake and its upper portion clearing the axle structure, and an oil tray extending across the sump and being mounted on the engine separately from the oil pan.

ROBERT R. HUTCHISON.